(12) United States Patent
Hazan

(10) Patent No.: US 10,977,467 B2
(45) Date of Patent: Apr. 13, 2021

(54) MULTICOLOUR RECTANGULAR PHOTO MARKERS AND METHODS OF USING THEREOF

(71) Applicant: Nir Hazan, Sde Yoav (IL)

(72) Inventor: Nir Hazan, Sde Yoav (IL)

( * ) Notice: Subject to any disclaimer, the term of this patent is extended or adjusted under 35 U.S.C. 154(b) by 0 days.

(21) Appl. No.: 16/616,620

(22) PCT Filed: Jul. 19, 2018

(86) PCT No.: PCT/IL2018/050802
§ 371 (c)(1),
(2) Date: Nov. 25, 2019

(87) PCT Pub. No.: WO2019/016815
PCT Pub. Date: Jan. 24, 2019

(65) Prior Publication Data
US 2020/0134276 A1    Apr. 30, 2020

Related U.S. Application Data

(60) Provisional application No. 62/534,700, filed on Jul. 20, 2017.

(51) Int. Cl.
*G06K 7/14*    (2006.01)
*G06T 7/90*    (2017.01)

(52) U.S. Cl.
CPC ......... *G06K 7/1417* (2013.01); *G06K 7/1443* (2013.01); *G06K 7/1456* (2013.01); *G06K 7/1469* (2013.01); *G06T 7/90* (2017.01)

(58) Field of Classification Search
CPC ... G06K 7/1417; G06K 7/1443; G06K 7/1456
(Continued)

(56) References Cited

U.S. PATENT DOCUMENTS 10,723,281 B1 *   7/2020  Briggs ................ G01C 25/00
2014/0171787 A1 *  6/2014  Garbey ................ A61B 5/061
                                                    600/424
(Continued)

FOREIGN PATENT DOCUMENTS

WO    WO2017089968    6/2017

OTHER PUBLICATIONS

"2D-barcode for Mobile Devices", Edith Cowan University, Research Online, Theses, 2005; Retrieved from the Internet: <URL: https://ro.ecu.edu.au/cgi/viewcontent.cgi?referer=https://scholar.google.co.il/&httpsredir=1&article=2387&context=theses_hons> Kato Hiroko Dec. 31, 2005 (Dec. 31, 2005).

*Primary Examiner* — Allyson N Trail
(74) *Attorney, Agent, or Firm* — Haim M. Factor—1st-Tech-Ideas

(57) ABSTRACT

A multicolor 2D-photo-marker including a rectangular matrix of data pixels, framed by a contrasting matrix locator, wherein the rectangular matrix of data pixels includes at least one orientation data pixel that carry photo-marker orientation information and is located at a pre-selected location, and wherein a unique color and location combination of the multiple data pixels encodes identification information of the object with which the multicolor 2D-photo-marker is coupled with. Preferably, the rectangular matrix of data pixels further includes color reference pixels, each located at a pre-selected location, designated to serve as dictionary hue pixels. Preferably, the pre-selected location of each color reference pixels is at a corner of the rectangular matrix of data pixels. An orientation data pixel may also serve as a color reference pixel.

20 Claims, 13 Drawing Sheets

(58) Field of Classification Search
USPC .................................................. 235/462.09
See application file for complete search history.

(56) References Cited

U.S. PATENT DOCUMENTS

| | | |
|---|---|---|
| 2016/0232685 A1 | 8/2016 | Hefetz |
| 2019/0156086 A1* | 5/2019 | Plummer ................ G06T 7/248 |
| 2020/0143155 A1* | 5/2020 | Hodge ............... G06K 9/00771 |

\* cited by examiner

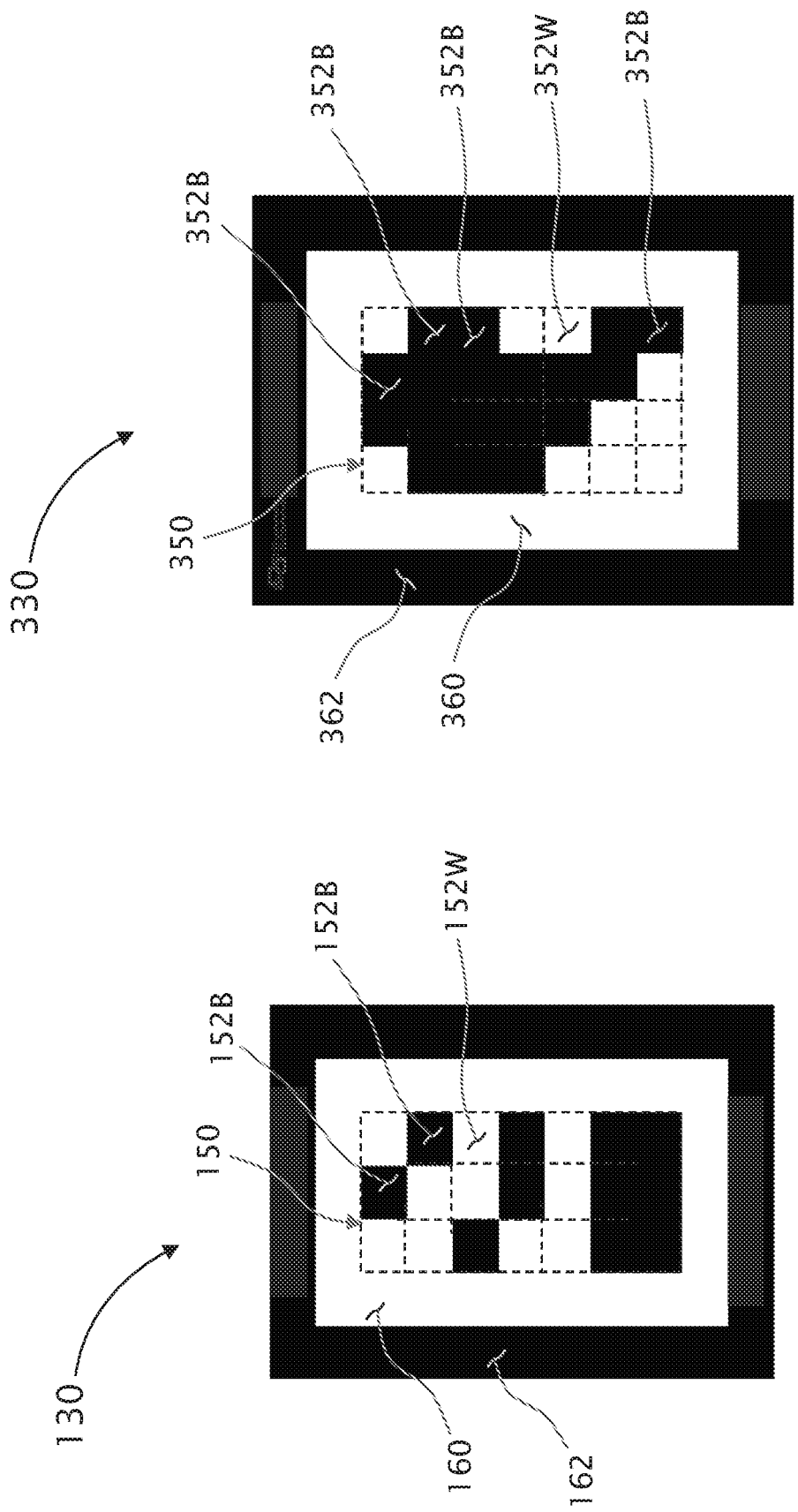

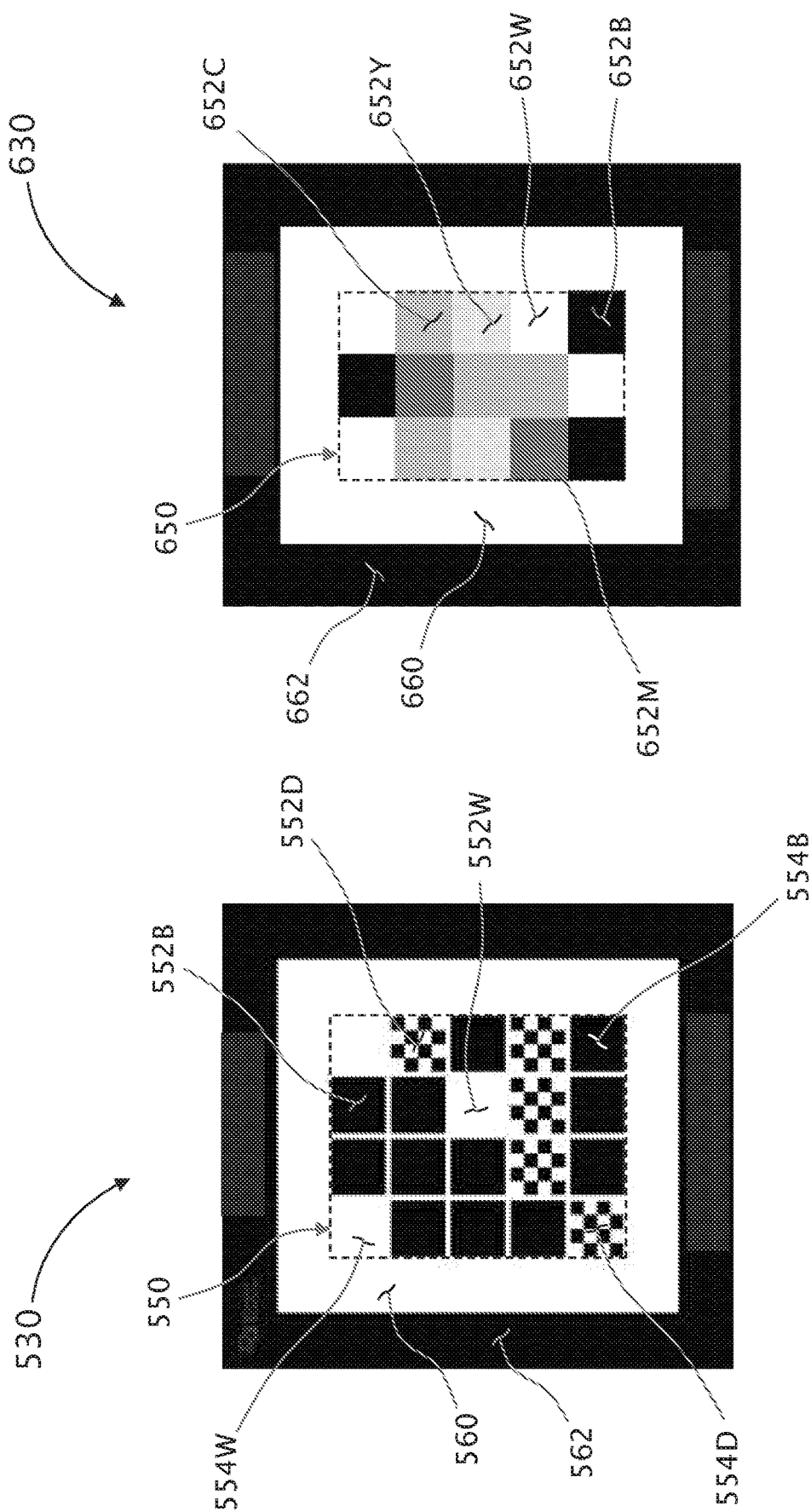

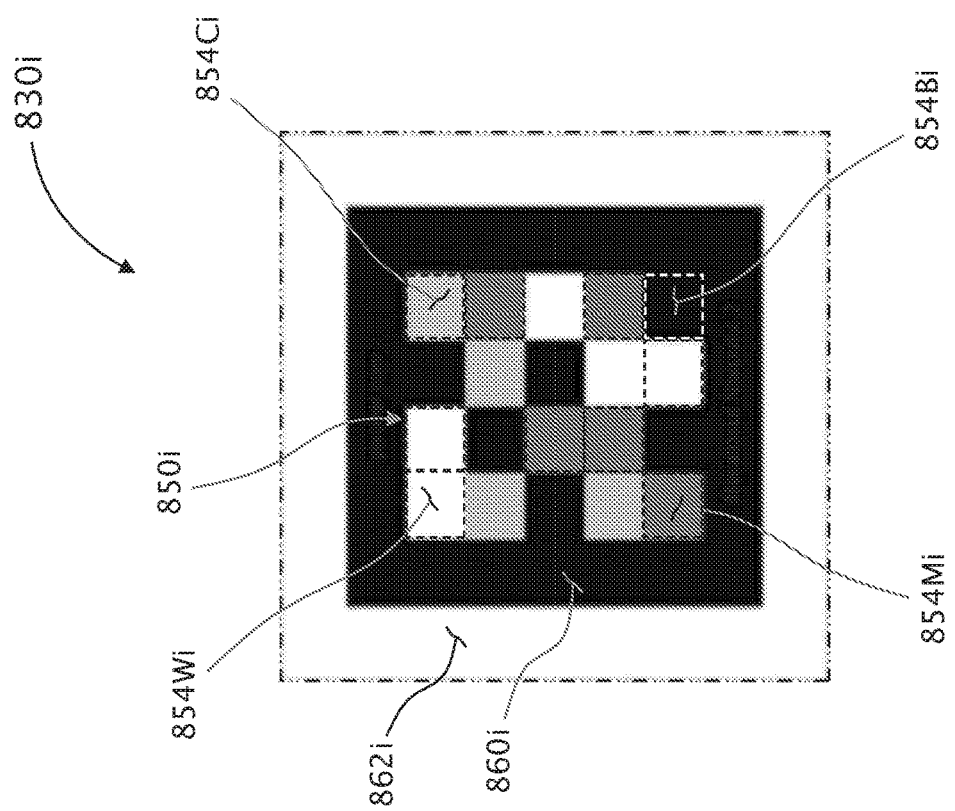
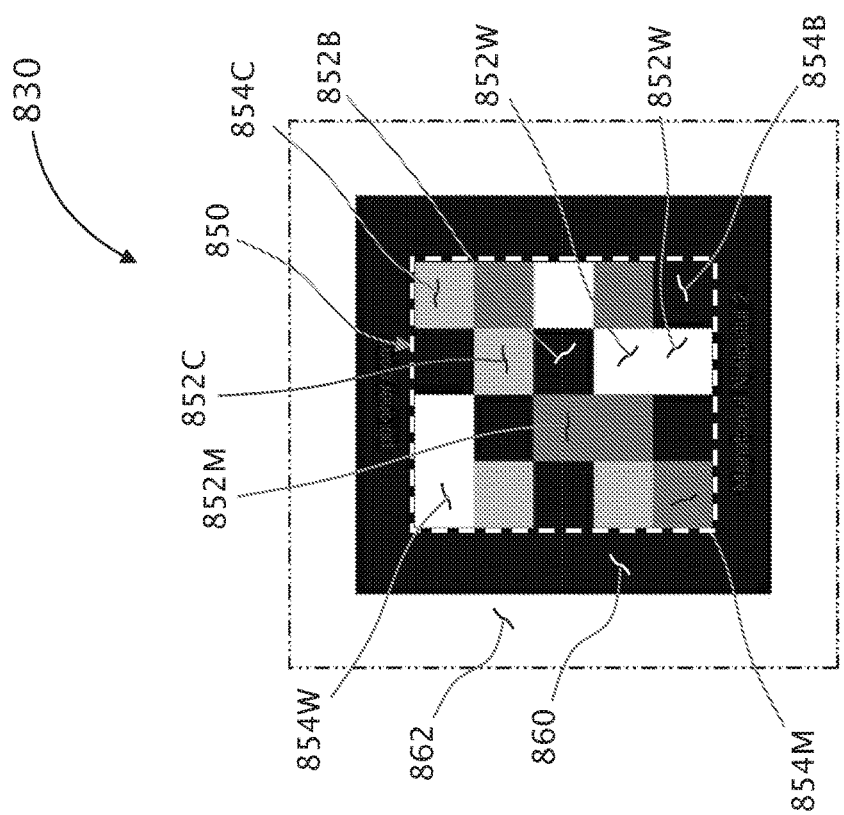
Fig. 12
Fig. 11

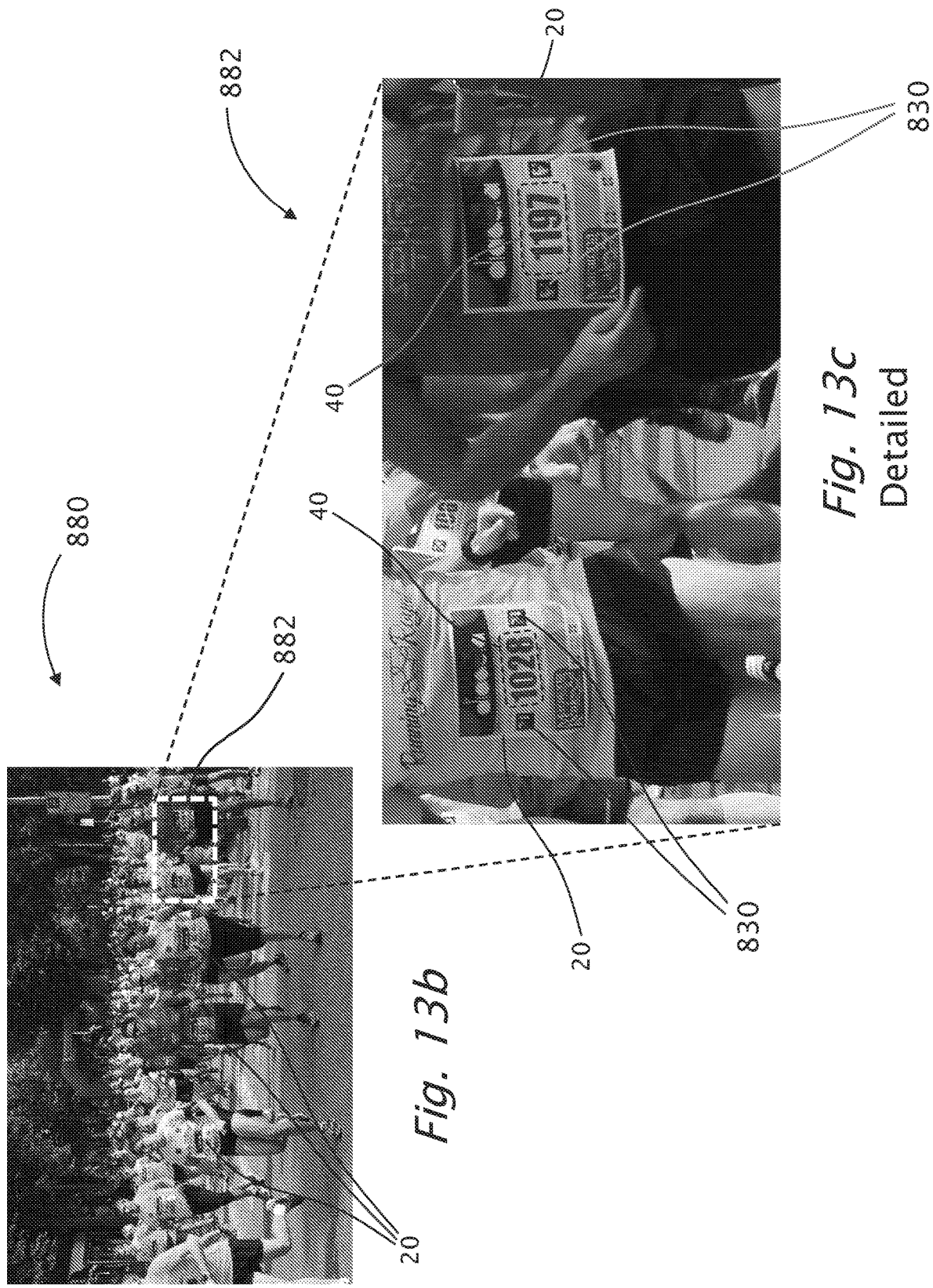

MULTICOLOUR RECTANGULAR PHOTO MARKERS AND METHODS OF USING THEREOF

FIELD OF THE INVENTION

The present invention relates to tags, systems and methods for digital image frame uniquely tagging individuals or objects ("objects") that are imaged and more particularly, the present invention relates to multicolor tags, a computerized system and methods for matching one or more stationary or moving objects, which objects participate in an event with mass participation or gathered together such that they appear in one or more digital image frames and wherein each object carries a visible rectangular photo id marker.

BACKGROUND OF THE INVENTION

Large events such as sports events, business or fun gatherings, amusement parks and the like, are often filmed in order to be documented and replayed. As technology develops, users or participants such as runners are searching for an easy and automatic way to receive their photos and videos. Existing systems often demand a great deal of effort from the photographers capturing/filming the event, the user who wishes to receive his photos/video clips often depends on expensive and cumbersome equipment such as personal timing chips and heavy cumbersome chip detectors.

In another application, supermarket shops stock millions of items that needs to be tracked in order to identify stock quantities, warehouse material movements, product expiration, etc. This is done today with older type barcodes and RF equipment. It would be advantageous to be able to image a bulk of objects in a single or more photographs and extract the information off the respective photo ID marker by analysing one or more acquired image frames. Current existing art can be found, for example, in https://www.youtube.com/watch?v=vorkmWa7He8, products carry a label containing information related to the coupled product item, such as shelf location, price, expiration date, and so forth.

An event can be a sports event such as a running race, triathlon, bicycle race etc., or a social event such as a wedding, a festival, a conference, etc. The organizers of such events typically have many photographs taken of the event, and wish to provide the photographs within a limited period of time.

One way known in the art to identify a participant in a digital photo is by assigning each participant a uniquely visible event identification (EID), also referred to as "bib", that is worn or carried by the participant, wherein the EID includes a machine readable, square photo marker that is associated with that participant. An image processing module analyzes a digital photograph of an event where one more participant appear and identifies one or more photo markers worn by the participants. Each photo marker includes a square binary matrix with a unique value associated with an EID. A matrix analysis module reads the identified matrix, calculates its value and matches the participant with the digital photograph in which the participant appears in.

WIPO Patent Application WO/2017/089968 discloses A method of analyzing and presenting at least one video of a user in a comprehensive personal clip of the user's participation in an event, the method includes providing users of the event with an identification sign, the identification sign includes at least one unique two-dimensional (2D) photo marker pattern and at least one predesigned common pattern; creating a lookup table of users' IDs, each user's ID being associated with the user's unique 2D photo marker pattern; receiving at least one video of the event; extracting sample frames from the at least one video of the event in an initial predetermined rate; detecting and identifying at least one unique 2D photo marker pattern in the sample frames and creating a time appearance index representing at least one user's at least one video segment, according to the at least one identified unique 2D photo marker pattern; editing at least one of the at least one video segment that features at least one of the users based on the time appearance index; and integrating the at least one video segment into a comprehensive personal clip.

One problem associated with this system is the limited space of the bib, whereas the square matrix occupies a large space of the bib. It should be noted that the images of a participant are taken from a distance that is typically over one meter and may reach 25 meters or more, the pixels of the unique matrix must be large enough to be identified in the image. This forces a minimal size of each pixel of the matrix of pixels. It should be noted that the printed pixel size also depends on the resolution of the image acquisition device, which may enable to acquire images of a participant from a distance that may reach 100 meters or more.

Another issue with decoding the photo markers on photos acquired from a distance is that often there exists a side angle, which causes deformation of the otherwise square or rectangular photo marker. Having more sideways stretching of the otherwise square or rectangular pixels of the photo marker, makes the side taken, deformed photo marker decodable from greater angles.

Another issue is the number of unique codes that a traditional black and white 2D barcode can provide unique codes may be sufficient for some applications but limited for others. Another issue associated with the limited space of the bib is the occlusion problem. For example, the hands of a runner are moving opaque objects that often occlude at least a portion of the barcode matrix and interfere with the detection process of the participant's ID. This also applies to bag straps, long hair, shirts, shorts, sloppy cloths, external objects, etc. One method to overcome the occlusion problem is to use two identical barcodes that are spaced apart.

Reference is now made to the drawings, FIG. 1a illustrates a prior art EID bib or plate 20 that includes a unique participant EID number 40, and two identical photo markers 30 that are spaced apart, one at each side of the participant EID number 40. Optionally, the bib 20 may further include the participant's name 42 and promotional data.

Each photo marker 30 includes the same 6×6 unique matrix 50 of pixels 52 that is associated with the unique participant EID number 40, wherein the pixels 52 unique layout represents the participant's EID number 40. Reference is also made to FIG. 1b, illustrating a prior art 6×6 matrix 50 of pixels 52 that is framed by a matrix locator having an inner frame 60, followed outwardly by a contrasting outer frame 62. The frames (60, 62) help detect the location of matrix 50, when decoding it in the decoding process.

Another issue that is indirectly associated with the limited space of the bib 20 is the fact that a number associated with the participant include multiple digits and it is often desirable for this number to be visible from a distance. The use of one or two barcodes further limits the available space of bib 20.

There is therefore a need and it would be advantageous to provide a solution to the limited space problem of the bib 20, which solution enables the use of one or two barcodes, wherein the digits of the participant EID number 40 can be enlarged, without compromising the number decoding capabilities.

SUMMARY OF THE INVENTION

The principal intentions of the present invention include providing a multiple color 2D photo marker facilitating a photo marker decoding system to identify an object/participant of an event that appears, at least partially, in one or more digital image frames containing a rectangular matrix, to locate the matrix of pixels in a photo marker displayed on a bib 20. The multiple colour photo marker includes a 2D matrix of pixels, wherein each of the metrices of pixels is framed by a matrix locator such as an inner frame, adjacently followed outwardly by a contrasting outer frame.

It should be noted that the present invention will be described hereon in terms of the photo-marker the present invention is not limited to being disposed on a bib 20, and may by place of any other object, moving or stationary, for example in the form of a sticker. In one non-limiting example, the photo marker sticker may be placed on a product sold in a store. A user may, for example, acquire an image of the group of products using his/her smartphone camera, whereas a suitable software application running on the smartphone processor decodes the matrix arrangement to provide information related to the coupled product item, such as shelf location, price, expiration date, and so forth. The extracted information may further be used with a digital wallet of the user to pay for the product.

Optionally, the pixels, which are typically square, are stretched either in the width dimension or the height dimension by a preconfigured amount and the expected photo acquisition angle.

According to the teachings of the present invention there is provided a multicolor 2D-photo-marker including a rectangular matrix of data pixels, framed by a contrasting matrix locator, wherein the rectangular matrix of data pixels includes at least one orientation data pixel that carry photo-marker orientation information and is located at a pre-selected location, and wherein a unique color and location combination of the multiple data pixels encodes identification information of the object with which the multicolor 2D-photo-marker is coupled with.

Preferably, the data pixels are stretched sideways in order to compensate for at least some of the narrowing down effect of the data pixels horizontal dimension, caused by a horizontal angle formed between the optical axis of the camera and the surface plane of the 2D-photo-marker.

Optionally, the data pixels have two colors.

Optionally, the colors are black and white.

Optionally, the data pixels have three colors and where the colors include a first color, a second color and a third color composed of dithering of the first color and the second color.

Preferably, the pre-selected location of the at least one orientation data pixel is at a corner of the rectangular matrix of data pixels.

Preferably, the rectangular matrix of data pixels includes two orientation pixels having contrasting colors.

Preferably, the rectangular matrix of data pixels includes color reference pixels, each located at a pre-selected location, designated to serve as dictionary hue pixels. Preferably, the pre-selected location of each color reference pixels is at a corner of the rectangular matrix of data pixels. An orientation data pixel may also serve as a color reference pixel.

Optionally, the contrasting matrix locator includes two adjacent frames having contrasting colors.

Optionally, the 2D-photo-marker is preconfigured to be displayed on the respective object either in standing position or in lying position.

It is an aspect of the present invention to provide a system for identifying the person/object, whose identity is uniquely encoded a multicolor rectangular data matrix of pixels of a 2D-photo-marker, as described above. The system including a camera and a processing unit, wherein the processing unit is configured to analyze an image frame containing a reflection of the 2D-photo-marker. The image frame is acquired such that the optical axis of the camera was not normal to the plane of the 2D-photo-marker and distal therefrom.

The processing unit is configured to correct the orientation of the reflection of the 2D-photo-marker. The processing unit is configured to determine the colored data pixels of the rectangular data matrix of pixels and the respective pixels locations within the rectangular data matrix. The processing unit is further configured to then extract the identity information identifying the person/object.

Optionally, the 2D-photo-marker is coupled with a participant of an event with mass participation.

Optionally, the camera is a still camera or a video camera.

According to further teachings of the present invention, there is provided an object identification method for identifying the person/object, whose identity is uniquely encoded in a multicolor rectangular data matrix of pixels of a 2D-photo-marker, as described above, the method including the steps of:

a) acquiring an image frame containing a reflection of at least one 2D-photo-marker;
b) locating the multicolor rectangular data matrix of pixels using the matrix locator;
c) locating the at least one orientation data pixel;
d) validating the orientation of the 2D-photo-marker and correcting as needed;
e) locating the dictionary hue pixels;
f) setting data pixels color and location, using the dictionary hue pixels;
g) providing a list of valid color-pixel and location combinations; and
h) decoding the data matrix to thereby extract the identity information identifying the person/object.

Preferably, the at least one orientation data pixel is the darkest corner pixel of the multicolor rectangular data matrix of pixels. Preferably, the validating of the orientation of the 2D-photo-marker includes verifying that the darkest corner pixel is at the expected corner of the multicolor rectangular data matrix of pixels. Upon determining that the darkest corner pixel is not at the expected corner of the multicolor rectangular data matrix of pixels, the correcting of the orientation of the 2D-photo-marker includes rotating the 2D-photo-marker until the darkest corner pixel is located at the expected corner of the multicolor rectangular data matrix of pixels.

Optionally, the method further includes a step of sanity check, after the setting of the data pixels color and location. Optionally, the sanity check includes validating that the lightest corner pixel is located at the expected corner of multicolor rectangular data matrix of pixels. Optionally, the sanity check includes validating that the shade difference between the lightest pixel and the darkest pixel is larger than a preconfigured threshold. Optionally, the sanity check includes validating that the brightness of the brightest pixel is higher than a preconfigured threshold. Optionally, the sanity check includes validating that the darkness of the darkest pixel is higher than a preconfigured threshold.

Typically, the acquiring of the image frame is performed distally from the at least one the 2D-photo-marker. The distance between the image acquisition device and the at least one 2D-photo-marker may range between one and a hundred meters and more.

Typically, the image frame contains multiple 2D-photo-markers. Preferably, each of the multiple 2D-photo-markers is processed individually.

Typically, image acquisition device is pointed towards multiple objects and wherein at least one object displays the 2D-photo-marker.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 3a illustrates the 2D, binary rectangular photo marker with, as shown in FIG. 2, that includes a 3×7 matrix of pixels.

FIG. 3b illustrates another example 2D, binary rectangular photo marker, having a 4×7 matrix of pixels, according to some embodiments of the present invention.

FIG. 6 illustrates a 2D, tri-colored rectangular photo markers according to some embodiments of the present invention, the photo marker including an example 4×5 rectangular matrix of pixels that is framed by a data matrix locator.

FIG. 12 depicts an image of the photo marker of the four-colors rectangular photo marker shown in FIG. 11.

FIG. 13b depicts an example photograph of a group of runners participating in a race, wherein each participant wears a bib.

FIG. 13c is an enlargement of a section of the photograph shown in FIG. 13b.

DETAILED DESCRIPTION OF THE INVENTION

Figure 1A:
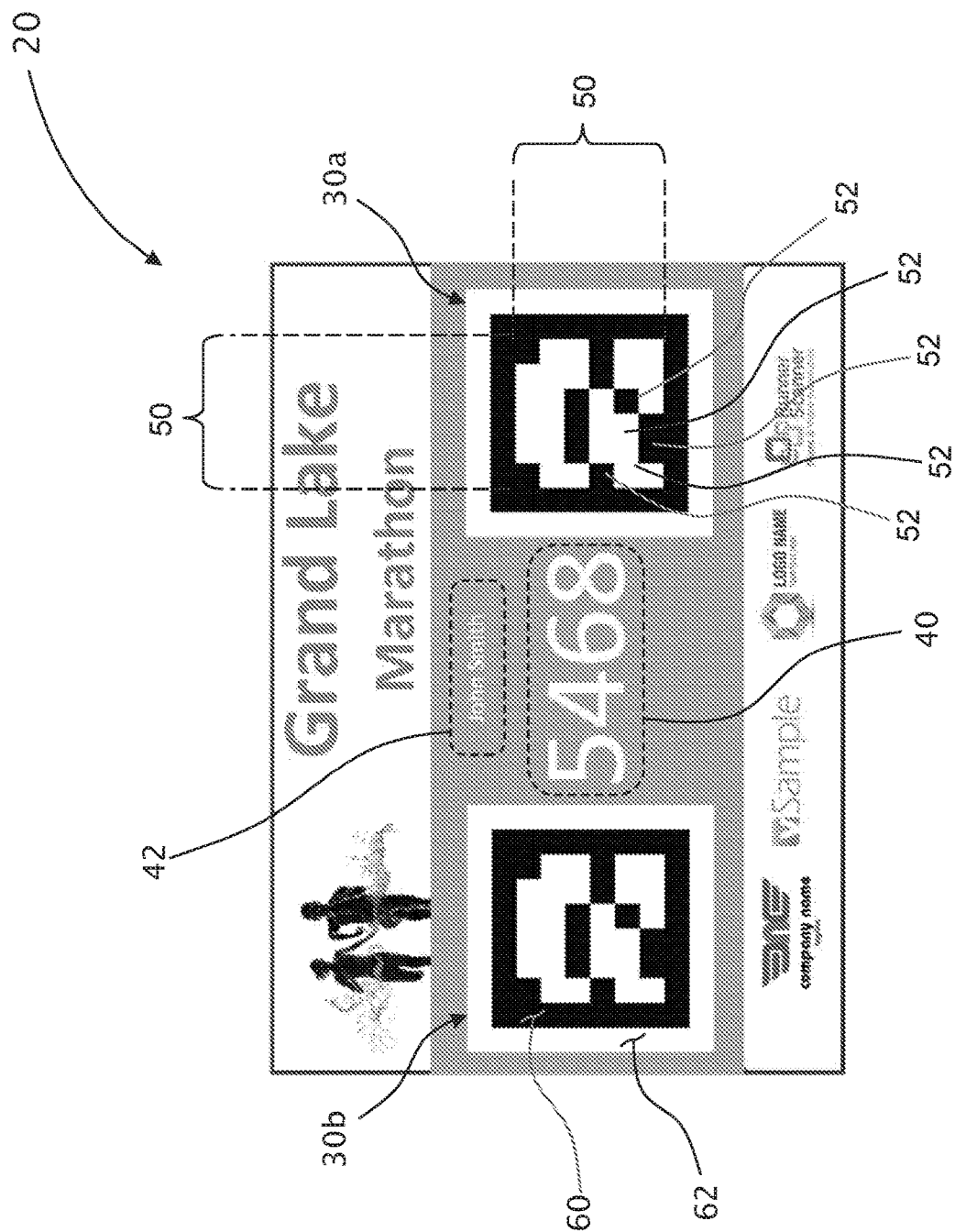
FIGS. 1a and 1a' illustrate an EID having a pair of identical prior art 2D binary photo markers, each photo marker having a 6×6 square matrix of pixels.
Figure 1B:
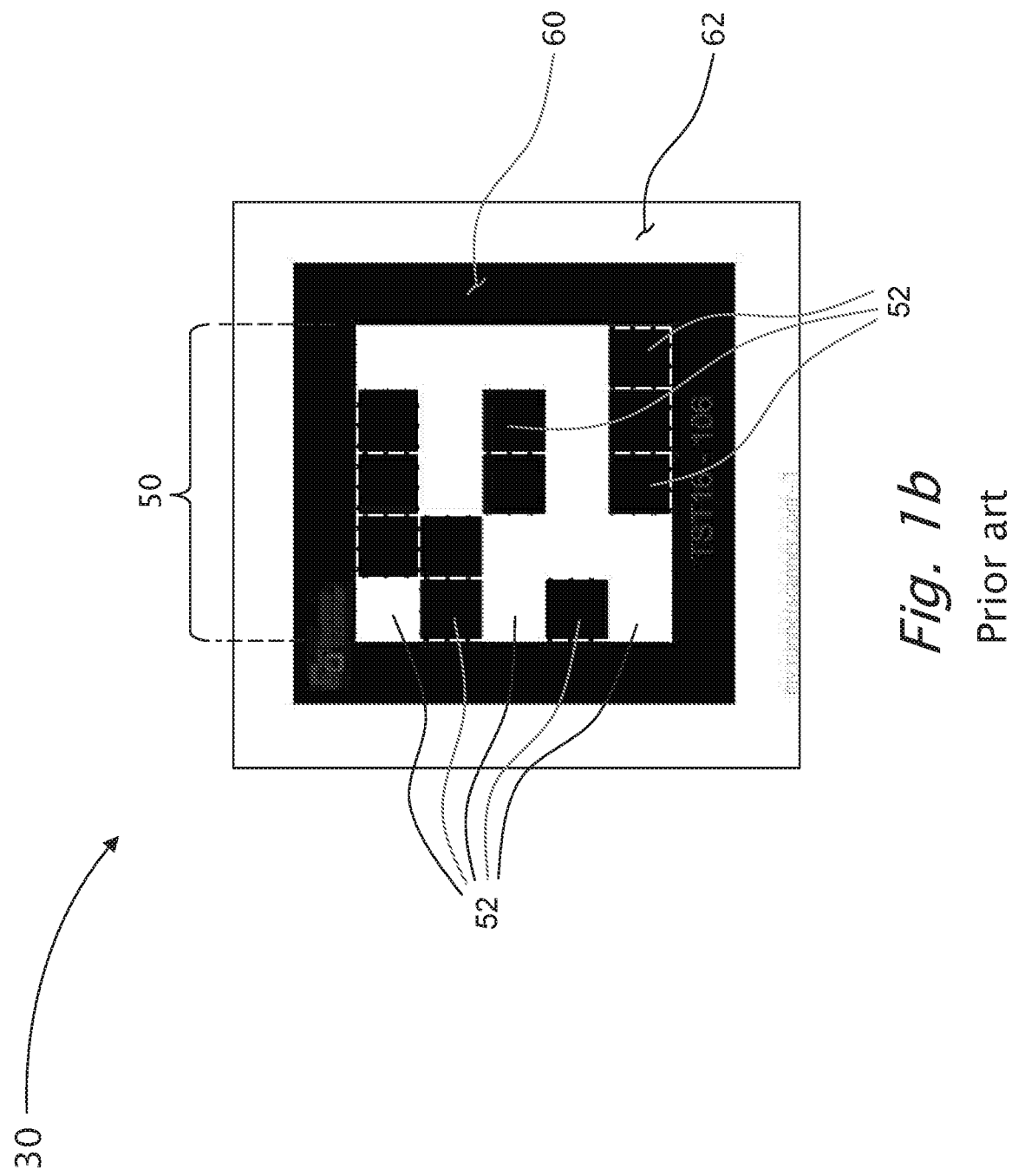
FIG. 1b illustrates a prior art 6×6 square photo marker having a matrix of pixels.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the inventions. The various appearances of "one embodiment," "an embodiment" or "some embodiments" do not necessarily all refer to the same embodiment. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. It is understood that the phraseology and terminology employed herein are not to be construed as limiting and are for descriptive purpose only.

Meanings of technical and scientific terms used herein are to be commonly understood as to which the invention belongs, unless otherwise defined. The present invention can be implemented in the testing or practice with methods and materials equivalent or similar to those described herein.

It should be noted that orientation related descriptions such as "bottom", "up", "upper", "down", "lower", "top" and the like, assumes that both the marker and the associated item is operationally situated in its natural standing position.

Reference is made back to the drawings. FIG. 2 illustrates an EID 100 having a pair of identical 2D, binary rectangular photo markers 130, according to embodiments of the present invention each photo marker 130a, 130b having an example 3×7 matrix. 150 of pixels 152. Reference is also made to FIGS. 3a and 3b that illustrate examples of photo markers (130, 330), each having an example rectangular matrix (150, 350) of pixels (152, 352), wherein each of the metrices of pixels is framed by a data matrix locator, and wherein the rectangular photo markers (130, 330) are in a standing position.

The inner frame (160, 360) and the outer frame (162, 362) serve as a locator module designed to enable a system for identifying a participant of an event that appears, at least partially, in a digital photograph containing a rectangular matrix, to locate the matrix of data pixels in a photo marker displayed on a bib 20.

The locator module includes two nested frames having two contrasting colors, typically, with no limitations, black and white. The high contrast in combination having a rectangular shape or is viewed as a quadrangular shape, indicates a potential photo marker for the locating algorithms.

It should be noted that since the rectangular photo marker has a narrow dimension and a wide dimension. Typically, when in use, the EID is situated in a general vertical orientation. Hence, when the wide dimension of the photo marker is the height of the photo marker, the photo marker is referred to as being in "standing position". When the narrow dimension of the photo marker is the height of the photo marker, the photo marker is referred to as being in "lying position".

Referring back to FIGS. 2 and 3a, rectangular photo marker 130 has a 3×7 matrix 150 of pixels 152, meaning that up to about 2M participants may participate in the event, and obtain a unique participant EID number 40. Referring to FIG. 3b, another non-limiting example photo marker 330 has a 4×7 rectangular matrix 150 of pixels 152, meaning that up to about 256M participants may participate in the event, and obtain a unique participant EID number 40. The 6×6 pixels photo marker 30, provides up to about 68B unique participant EID numbers 40.

It should be noted that when the potential number of participants that a matrix provides is much higher than required at a particular event, some of the pixels may be used to determine the orientation of photo marker 130.

It should be further noted that when the potential number of participants that a matrix provides is much higher than required at a particular event, some of the pixels may be used to forward error correction codes, for example, by using Hamming codes or Reed-Solomon principals.

Using a rectangular photo marker such as rectangular photo marker 130, enables using a pair of photo markers 130, on each side of the EID number 40, in order to overcome the occlusion problem. However, a typical bib 20 offers a limited space therebetween the two photo markers, in particular, when the EID number 40 contain 3 or more digits.

Figures 1A, 2:
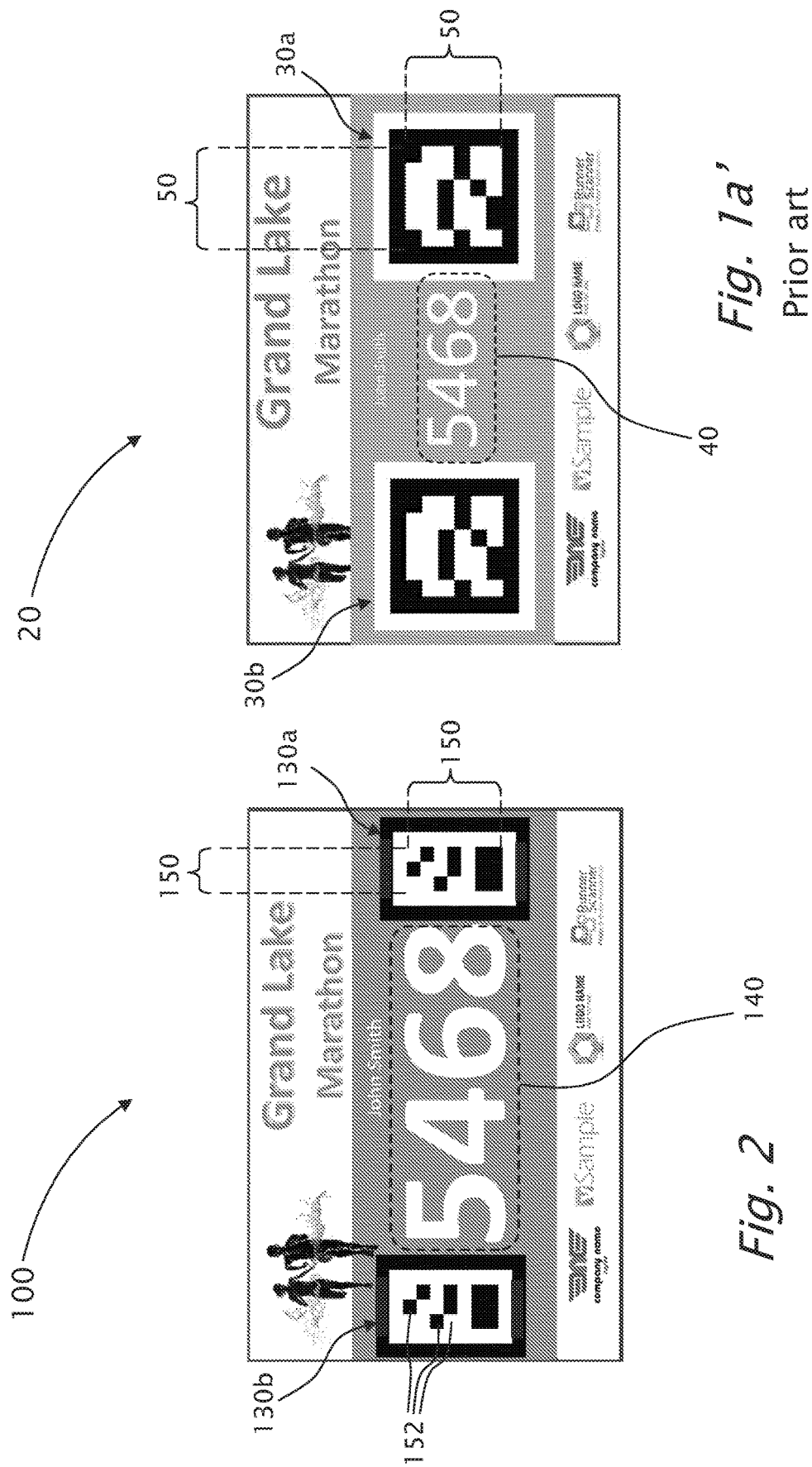
FIG. 2 illustrates an EID having a pair of identical 2D, binary photo markers, according to embodiments of the present invention, each photo marker having an example 3×7 narrow rectangular matrix of pixels, wherein the photo markers are in a standing position.

Compared to a 6-pixels width prior art photo marker or the 5-pixels width of a prior art photo marker 30, the present invention may use a 3-pixels width photo marker, such as shown in the example rectangular photo marker 130, or a 4-pixels width photo marker, such as shown in the example rectangular photo marker 330, without compromising on the maximal number of participants and still showing the EID number 40 with reasonable dimensions that can be visible from a distance, as illustrated in the examples shown in FIGS. 2 and 1a'.

Referring now to the minimal size of each pixel of the matrix required, when acquiring the images of the matrices from a distance, further improvement is provided by the present invention. Reference is now also made to FIG. 4a, illustrating an example of rectangular photo marker 230 having the same number of pixels and in the same layout as in rectangular photo marker 130, but the entire photo marker is stretched sideways by 20% (as a non-limiting example), including pixels 252, wherein photo markers 230 are in a standing position.

Hence, when acquiring the images of the matrices from a distance and with a side angle, the stretching of the pixels sideways compensates at least some of the narrowing down effect of the pixels horizontal dimension, caused by the horizontal angle between the optical axis of the camera and the surface plane of the imaged bib 20.

Figure 4B:
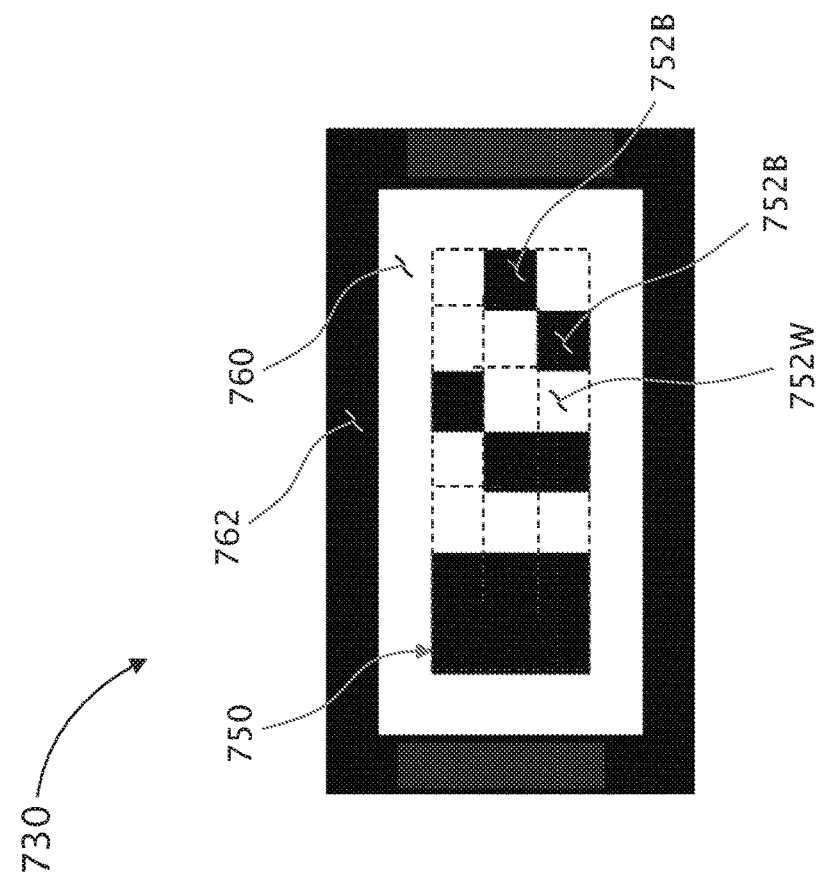
FIG. 4b illustrates the 7×3 pixels rectangular photo marker, as shown in FIG. 3a, wherein the larger dimension of the rectangular photo marker is stretched sideways by 20% (as a non-limiting example), according to some embodiments of the present inventions.
Figure 4A:
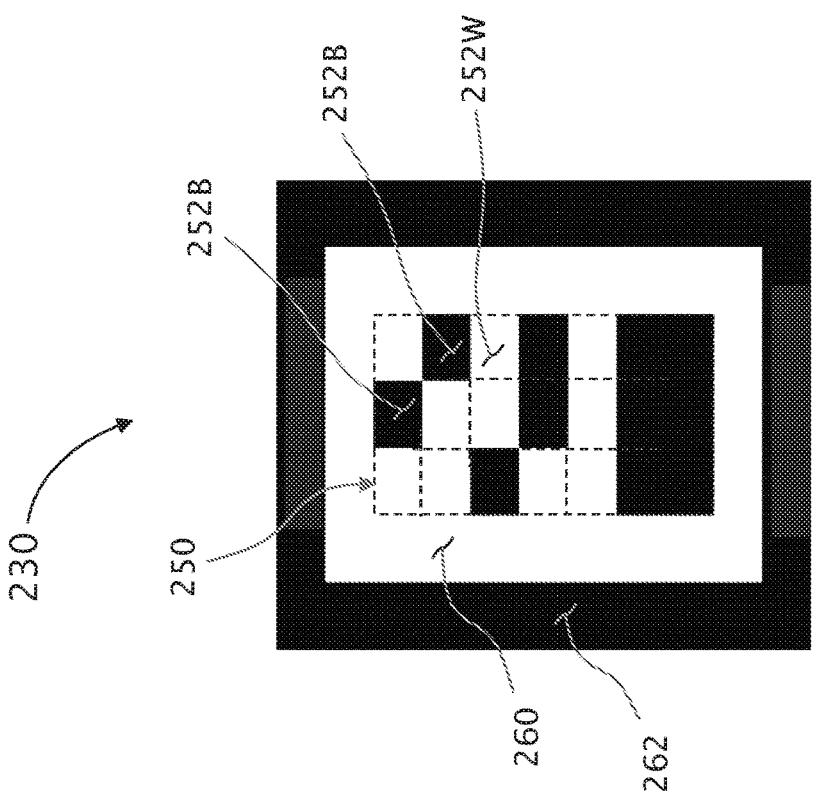
FIG. 4a illustrates the 3×7 pixels rectangular photo marker, as shown in FIG. 3a, wherein the smaller dimension of the rectangular photo marker is stretched sideways by 20% (as a non-limiting example), according to some embodiments of the present invention.
Figures 5A, 5B:
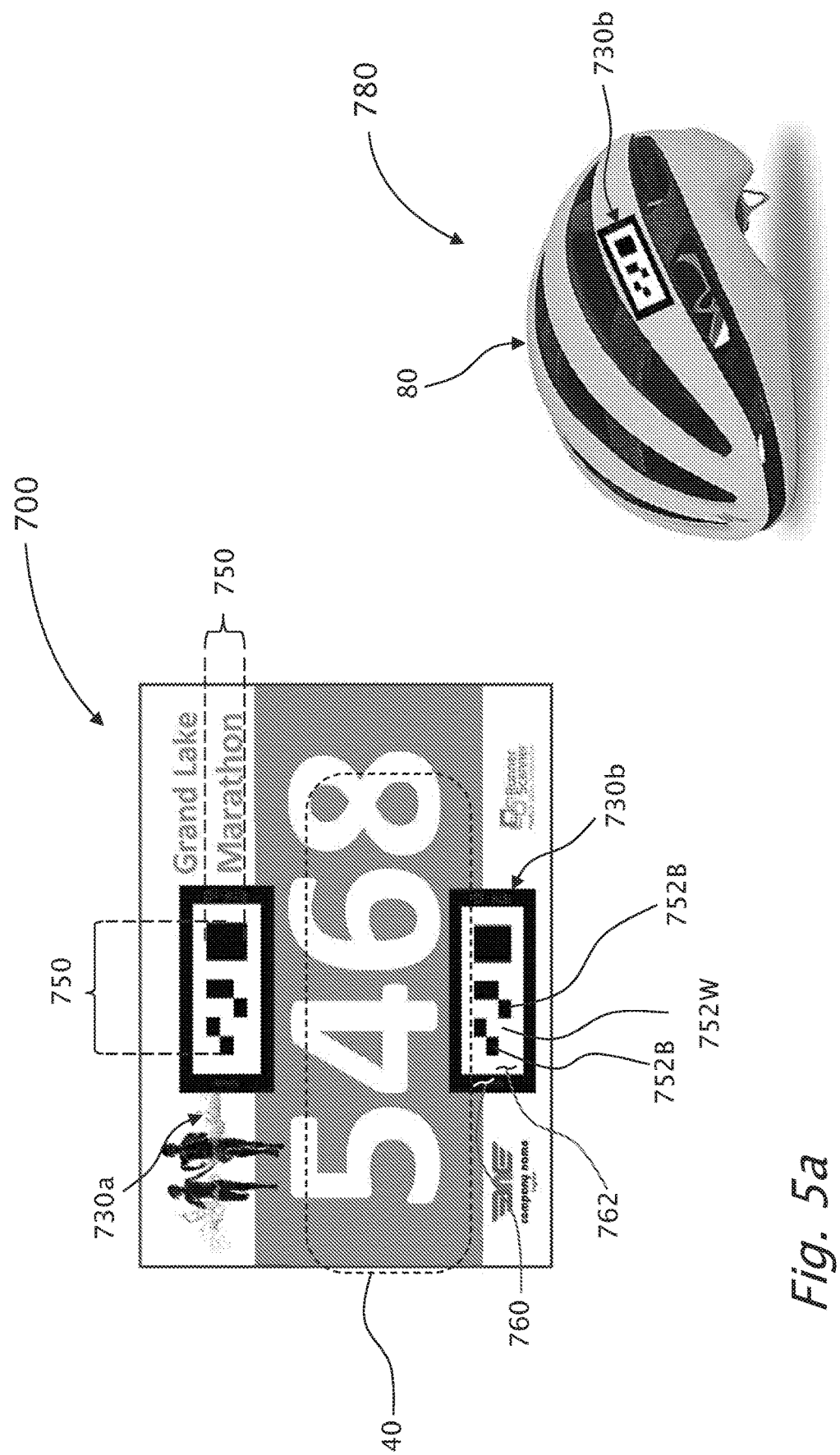
FIG. 5a illustrates an EID having a pair of identical 2D, binary photo markers, according to embodiments of the present invention, each photo marker having an example 7×3 rectangular matrix of pixels that is framed by a data matrix locator, wherein the photo markers are in a lying position.
FIG. 5b illustrates a cyclist helmet carrying at least one binary photo marker as in FIG. 5a, according to embodiments of the present invention.

FIG. 4b illustrates rectangular photo marker 730 having the same number of pixels and in the same layout as in rectangular photo marker 130, but the smaller dimension of each rectangular photo marker is stretched by 20%, including pixels 752, wherein photo markers 730 are in a lying position. FIG. 5a illustrates an EID bib 700, having a pair of identical 2D, binary photo markers 730, according to embodiments of the present invention, each photo marker 730 having an example 7×3 rectangular matrix 750 of pixels 752, wherein matrix 750 is framed by a data matrix locator (760, 762), and wherein photo markers 730 are in a lying position. FIG. 5b illustrates another example in the form of a cyclist helmet 80 carrying at least one binary photo marker 730 as in FIG. 5a, according to embodiments of the present invention. The tagged helmet 780 exemplifies objects for which it is recommended to use photo marker 730 that are in a lying position.

In this example, the two matrices 750 are spaced apart vertically, therefor the stretching of the photo markers 730 does not affect the space designated to accommodate the EID number 40.

According to further aspects of the present invention, in order to reduce the number of pixels without reducing the number of the participants in an event with mass participation, it is provided a reliable tri-colored rectangular photo marker. FIG. 6 illustrates an example of a 2D, tri-colored rectangular photo marker 530, according to some embodiments of the present invention. The example tri-colored rectangular photo marker 530 includes an example 4×5 rectangular matrix 550 of pixels 552 that is framed by a matrix locator. The third color is obtained by using dithering technology, that is using smaller black and white pixels in a preconfigured density. The tri-colored 4×5 pixels photo marker 530, provides up to about 3.5G unique participant EID numbers 40. Hence, the area occupied by that tri-colored photo marker can be substantially reduced compared with a binary photo marker.

In the example shown in FIG. 6, a dithered pixel 552D is composed of a 4×4 sub-pixels arranged in a chess-board configuration. The optics' nature causes a "blur" effect that brings the dithered pixel to a gray level of about 127 (in an 8-bit depth gray level system). Hence, after processing, the three colors are as follows: 0 gray-level is black, 255 gray-level is white and ~127 gray-level is gray. It should be noted that a gray obtained by dithering, rather than by a printed gray, is better since it creates an accurate gray in the image without suffering from the inaccuracies of a printer's gray ink and it is suitable for B&W inexpensive printers.

Figures 7, 10:
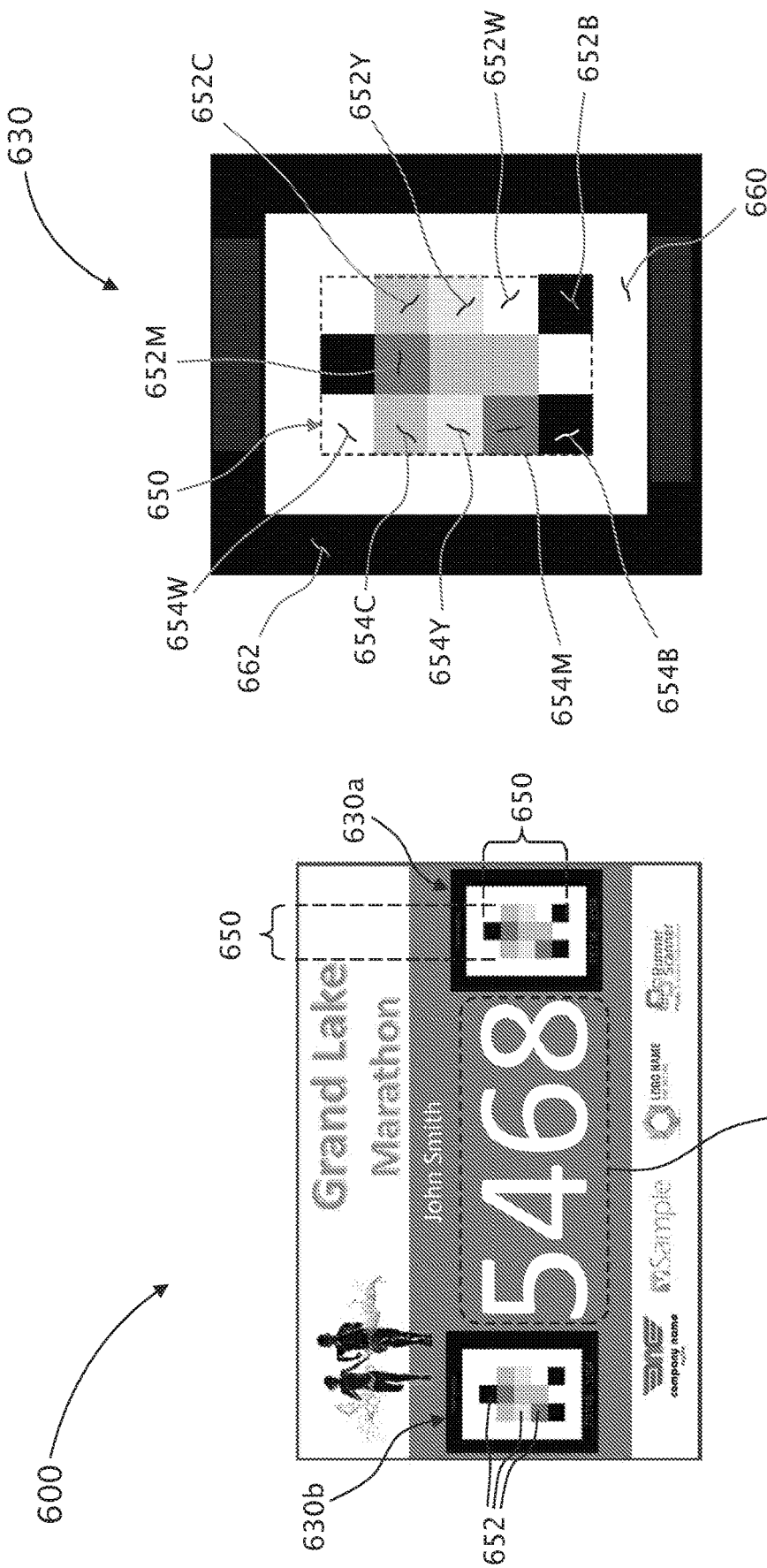
FIGS. 7 and 7' illustrate an example 2D, five-colors photo marker, according to some embodiments of the present invention, the photo marker including an example 3×5 rectangular matrix of pixels.
FIG. 10 illustrates an EID having a pair of identical 2D, five-colors photo markers, according to embodiments of the present invention, each photo marker having an example 3×5 rectangular matrix of pixels, wherein the photo markers are in a standing position.

According to further aspects of the present invention and in order to further reduce the number of pixels required to uniquely represent the number of the participants in an event with mass participation, more colors may be used. FIGS. 7 and 7' illustrate an example 2D, five-colors rectangular photo marker 630, according to some embodiments of the present invention. The example five-colors rectangular photo marker 630 includes an example 3×5 matrix 650 of pixels 652 that is framed by a matrix locator. The five-colors 3×5 pixels photo marker 630, provides up to about 30T unique participant EID numbers 40.

Hence, the area occupied by that five-colors photo marker can be substantially reduced compared with a binary photo marker.

Figure 8:
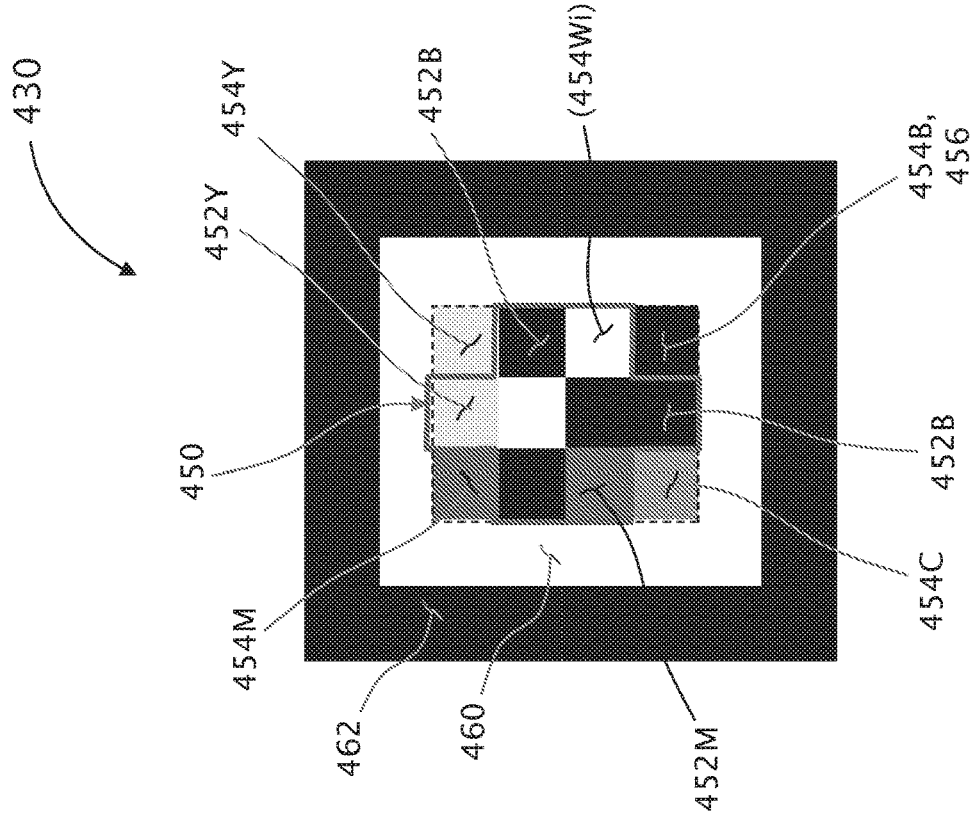
FIG. 8 illustrates another example 2D, five-colors rectangular photo marker, wherein the photo marker includes an 3×4 rectangular matrix of pixels.

FIG. 8 illustrates another example 2D, five-colors rectangular photo marker 430, wherein the photo marker includes an 3×4 rectangular matrix 450 of pixels 452 that is framed by a matrix locator. Having a 3×4 matrix 450, photo marker 630, provides up to about 244G unique participant EID numbers 40.

In the examples shown in FIGS. 7 and 8, the colors used, by way of example only, with no limitation to the colors selected, the five colors are Black, White, Cyan, Magenta and Yellow.

Figure 9:
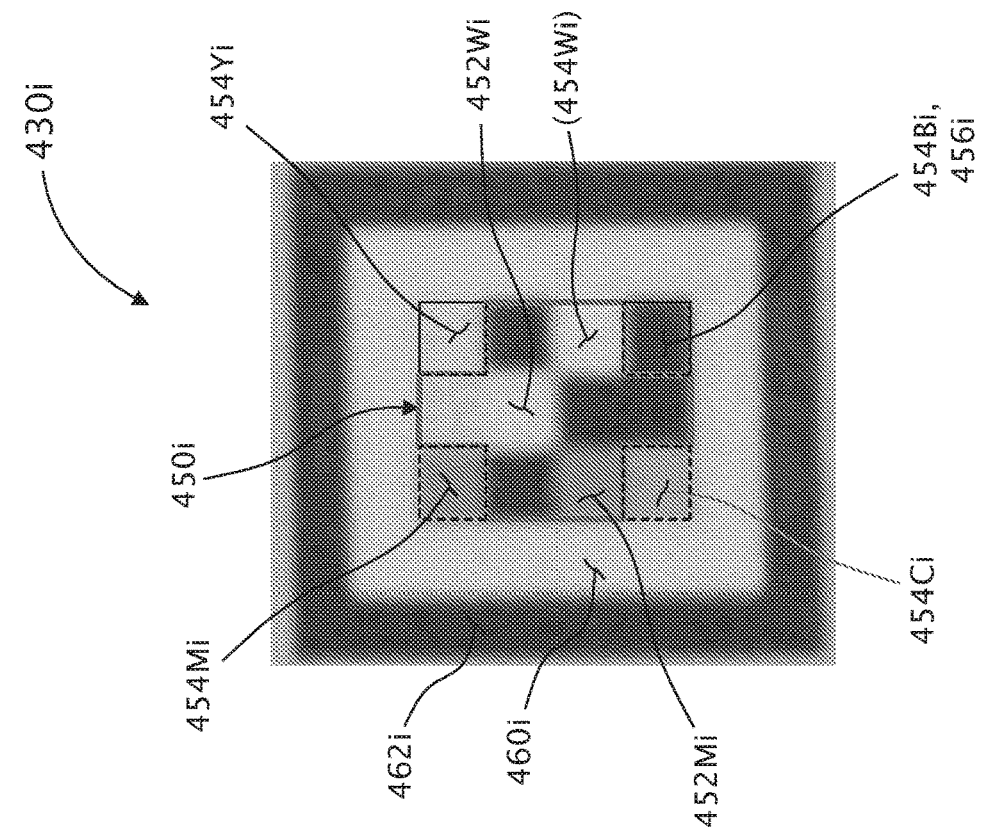
FIG. 9 depicts an image of a five-colors rectangular photo marker shown in FIG. 8.

Since the optics may cause chromatic deformations on each of the colored pixels, there is a need to provide means for determining the color of each pixel. FIG. 9 depicts a chromatic deformed image of photo marker 430*i* of the five-colors rectangular photo marker 430, shown in FIG. 8. To identify each of the colors used, and the orientation of photo marker 430, a reference set of color pixels is created and included on every photo marker. The reference set of colors, as set and printed on photo marker 430, is later used as dictionary colors 454*i* in the image of photo marker 430*i*, to compare the colors of each data pixel to the dictionary colors in order to overcome potential chromatic errors caused by print issues or image acquisition conditions. This is exemplified, with no limitations, in the following steps, with reference to FIGS. 8 and 9:

1. In a preliminary step, use the corner pixels of rectangular matrix 450 on photo marker 430 as reference pixels 454, as follows:
   a. Set, with no limitations, the bottom-right pixel to be a black reference pixel 454B.
   b. Set, with no limitations, the bottom-left pixel to be a cyan reference pixel 454C.
   c. Set, with no limitations, the top-right pixel to be a yellow reference pixel 454Y.
   d. Set, with no limitations, the top-left pixel to be a magenta reference pixel 454M.
   It should be noted that the above corner assignments to the reference pixels 454 and/or orientation pixels 456 are given by way of example only, with no limitations, including using non-corner pixels.
2. Identify the boundaries of rectangular matrix 450*i*, using inner locator frame 460*i* and optionally, also outer locator frame 462*i*.
3. Knowing the pixel layout of rectangular matrix 450*i*, a processing unit of the system is configured to identify a photo marker that appears, at least partially, in a digital photograph containing quadrangular matrix 450*i*.
4. Optionally, sample the outer locator frame 462*i* in the image 430*i* of photo marker 430 to thereby determine the gray level/color-shade index of the black color. Optionally, if no orientation problem exists, average at least a portion of the bottom-right pixel 454B*i* of the image frame of photo marker 430*i*, to thereby determine the hue index of the black color.
5. Optionally, sample the inner frame 460*i* in the image frame of photo marker 430*i* to thereby determine the gray level/color-shade index of the white color.
6. Optionally, another non-corner data pixel 452W is used as a reference white pixel 454W for a dictionary pixels 454W*i*.
7. Compare the color-shade of the bottom-right pixel to the color-shade index of the black color, to thereby determine if the bottom-right pixel is black.
8. If the bottom-right pixel is not the darkest of all corners, rotate the rectangular matrix 450*i* by 900 until the darkest orientation pixel 456*i* is positioned at the bottom-right corner of rectangular matrix 450*i*.
9. Average at least a portion of the bottom-left pixel to thereby determine the hue index of the cyan color.
10. Average at least a portion of the top-right pixel to thereby determine the hue index of the yellow color.
11. Average at least a portion of the top-left pixel to thereby determine the hue index of the magenta color.

Knowing the pixel layout of rectangular matrix 450*i*, and having determined the unique hue indices of the five colors (in this example, with no limitations), the processing unit proceeds to determine the colors of each pixel 452*i* in the data matrix 450*i*, by matching the color of the current 452*i* to the nearest hue in the color dictionary 454 of the five colors.

It should be noted that having used 4 of the 12 pixels as dictionary pixels, 3×4 matrix 450, photo marker 430 may provide up to about 390K unique participant EID numbers 40, which is still sufficient to cover most events with mass participation.

It should be noted that any of the pixels of a data matrix may be used as dictionary pixels. In the example shown in FIGS. 10 and 7': FIG. 7' shows a photo marker 630 having an example 3×5 rectangular data matrix 650, wherein the 5 left-most pixels are used as the 5-colored dictionary pixels 654. FIG. 10 illustrates an EID 600 having a pair of identical 2D, five-colors photo markers 630, each photo marker of pixels, wherein photo markers are in a standing position. Since 5 of the 15 pixels are used as dictionary pixels, photo marker 630 may provide more than 9.76M unique participant EID numbers 40, which is sufficient to cover most events with mass participation.

Figure 11:
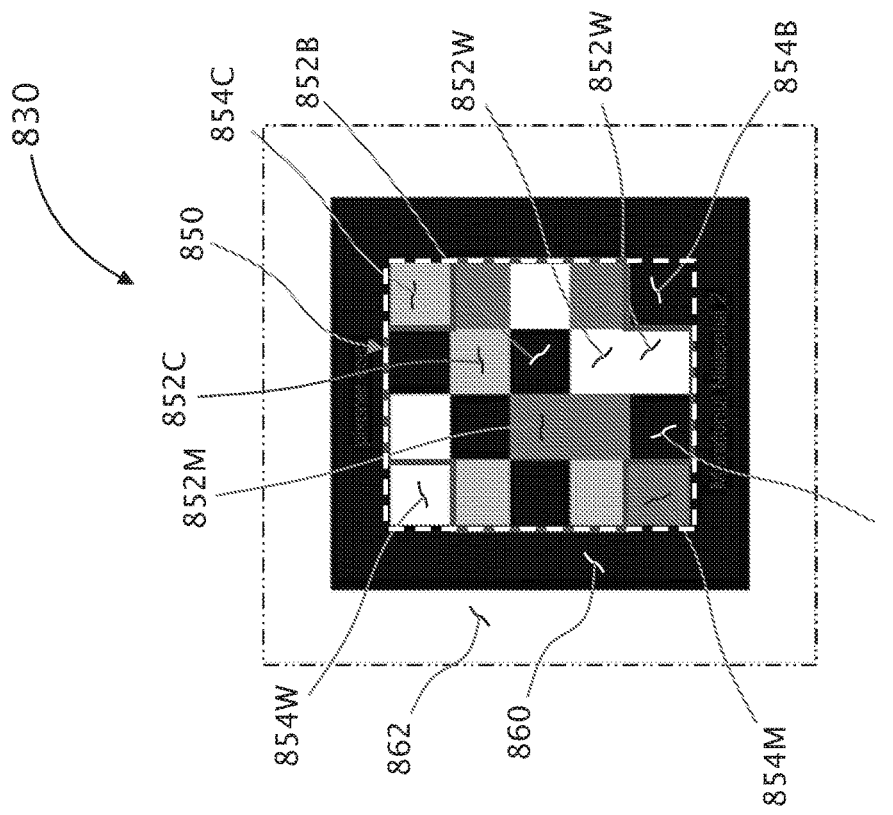
FIGS. 11 and 11' illustrate an example 2D, four-colors photo marker, according to some embodiments of the present invention, the photo marker including an example 4×5 rectangular matrix of pixels.

Reference is now made to FIG. 11, illustrating another example of a 2D, four-colors rectangular photo marker 830, according to some embodiments of the present invention. The example four-colors rectangular photo marker 830 includes an example 4×5 matrix 850 of pixels 852 that is framed by a matrix locator.

The four-colors 4×5 pixels photo marker 830 includes 4 color dictionary pixels 854, one at each pre-selected corner of matrix 850. Hence, the 20 pixels of the 4×5 matrix 850 are preferably subdivided into 16 data pixels 852 and 4 color dictionary pixels 854. In such a configuration, the four-colors 4×5 pixels photo marker 830, provides up to about 4 T unique IDs for participant EID numbers 40. For most events/applications this quantity of unique IDs is substantially more than need. Hence, the area occupied by that four-colors photo marker can be substantially reduced compared with a binary photo marker.

FIG. 12 depicts an image of photo marker 830*i* of the four-colors rectangular photo marker 830, shown in FIG. 11, wherein the optics cause chromatic deformations on each of the colored pixels. To identify each of the colors used, and the orientation of photo marker 830, a dictionary of colors is preferably created, as exemplified, with no limitations, in the following steps, being a variant of the steps described above with reference to FIGS. 8 and 9:

1. In a first preliminary step, given the event at hand the target group of individual objects, a look up table of valid color-pixel combinations and respective values, is generated. Typically, with no limitations, the color-pixel combinations generated are random combinations.
2. In a second preliminary step, use the corner pixels of rectangular matrix 850 on photo marker 830 as reference pixels 854, as follows:
    a. Set, with no limitations, the bottom-right pixel to be a black reference pixel 854B.
    b. Set, with no limitations, the top-left pixel to be a white reference pixel 854W.
    c. Set, with no limitations, the top-right pixel to be a cyan reference pixel 854C.
    d. Set, with no limitations, the bottom-left pixel to be a magenta reference pixel 854M.
    It should be noted that the above corner assignments to the reference pixels 854 and/or orientation pixels 856 are given by way of example only, with no limitations, including using non-corner pixels.
3. Identify the boundaries of rectangular data matrix 850i, using at least inner locator frame 860i and optionally, also outer locator frame 862i.
4. Knowing the pixel layout of rectangular matrix 850 and thereby 850i, including the preset reference pixels 854, 856, a processing unit of the system is configured to identify a photo marker that appears, at least partially, in a digital image frame containing quadrangular matrix 850i.
5. Find the darkest pixel in the color index pixels 854, setting it temporarily to represent the black color.
6. Find the lightest pixel in the color index pixels 854, setting it temporarily to represent the white color.
7. If the bottom-right pixel is not black, rotate the photo marker 830i until the darkest corner is at lower right corner of quadrangular data matrix 850i.
8. If top-left pixel is white, go to step 11 below.
9. If the bottom-right pixel is black and the top-left pixel is not white, discard this photo marker.
10. If after 3 rotations a match was not found, discard this photo.
11. Sample at least a portion of the top-right pixel to thereby determine the reflected hue of the cyan color.
12. Sample at least a portion of the bottom-left pixel to thereby determine the reflected hue index of the magenta color.
13. Compare the colors of each of the pixels 852 in the data matrix 850i. Knowing the pixel layout of rectangular data matrix 850 and thereby of matrix 850i, and having determined the color dictionary of the four colors (in this example, with no limitations), the processing unit proceeds to determine the colors of each data pixel 852i, by matching the color of the current 852i to the nearest hue in the reflected color dictionary 854i.
14. Check if the detected rectangular matrix 850l contains a valid combination of colored pixels.
15. If not valid—select the nearest valid combination and correct the result accordingly.
16. Determine, using the lookup table, the unique code coded by the pixels 852 of data matrix 850, to thereby facilitate the identification of the participant/object wearing the respective EID number 40.

Figure 13A:
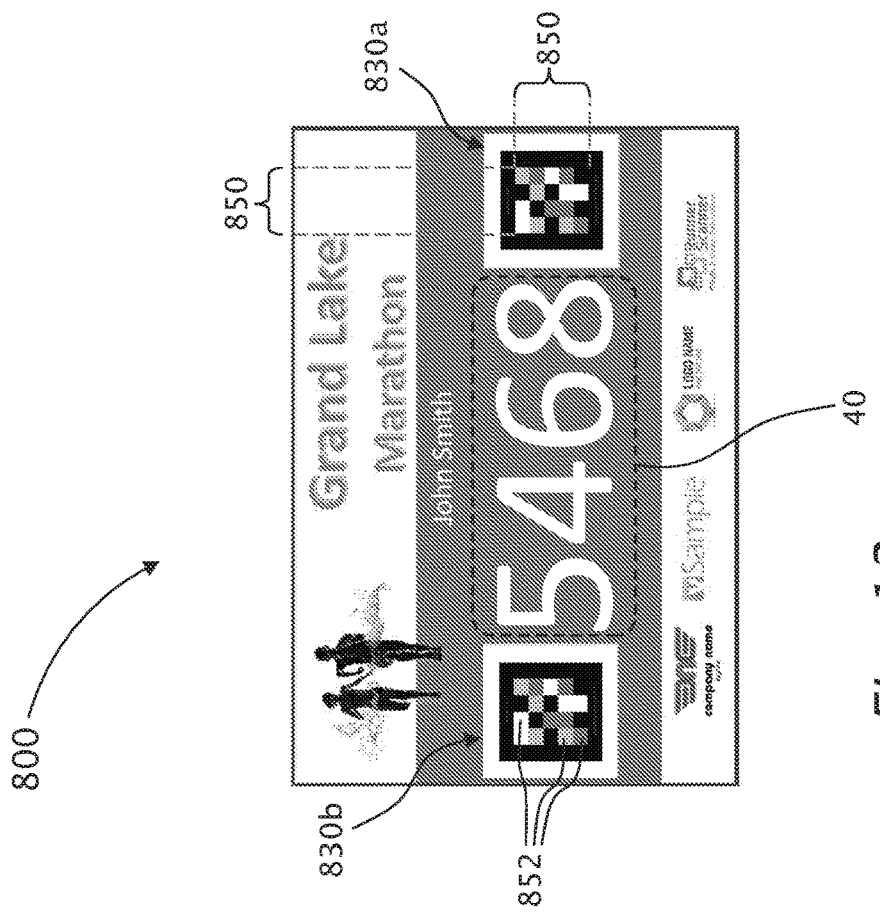
FIG. 13a illustrates an EID having a pair of identical 2D, four-colors photo markers, according to embodiments of the present invention, each photo marker having an example 4×5 rectangular matrix of pixels, wherein the photo markers are in a standing position.

FIG. 13a illustrates an EID 800 having a pair of identical 2D, four-colors photo markers 830, each photo marker having an example 4×5 rectangular matrix 850 of pixels, wherein photo markers are in a standing position. FIG. 13b depicts an example photograph 880 of a group of runners participating in a race, wherein each participant wears a bib 20. FIG. 13c is an enlargement of a section (882) of photograph 880 that shows in more details the content of two bibs 20, each including a unique participant EID numbers 40 and a pair of four-colors photo markers 830.

Figure 14:
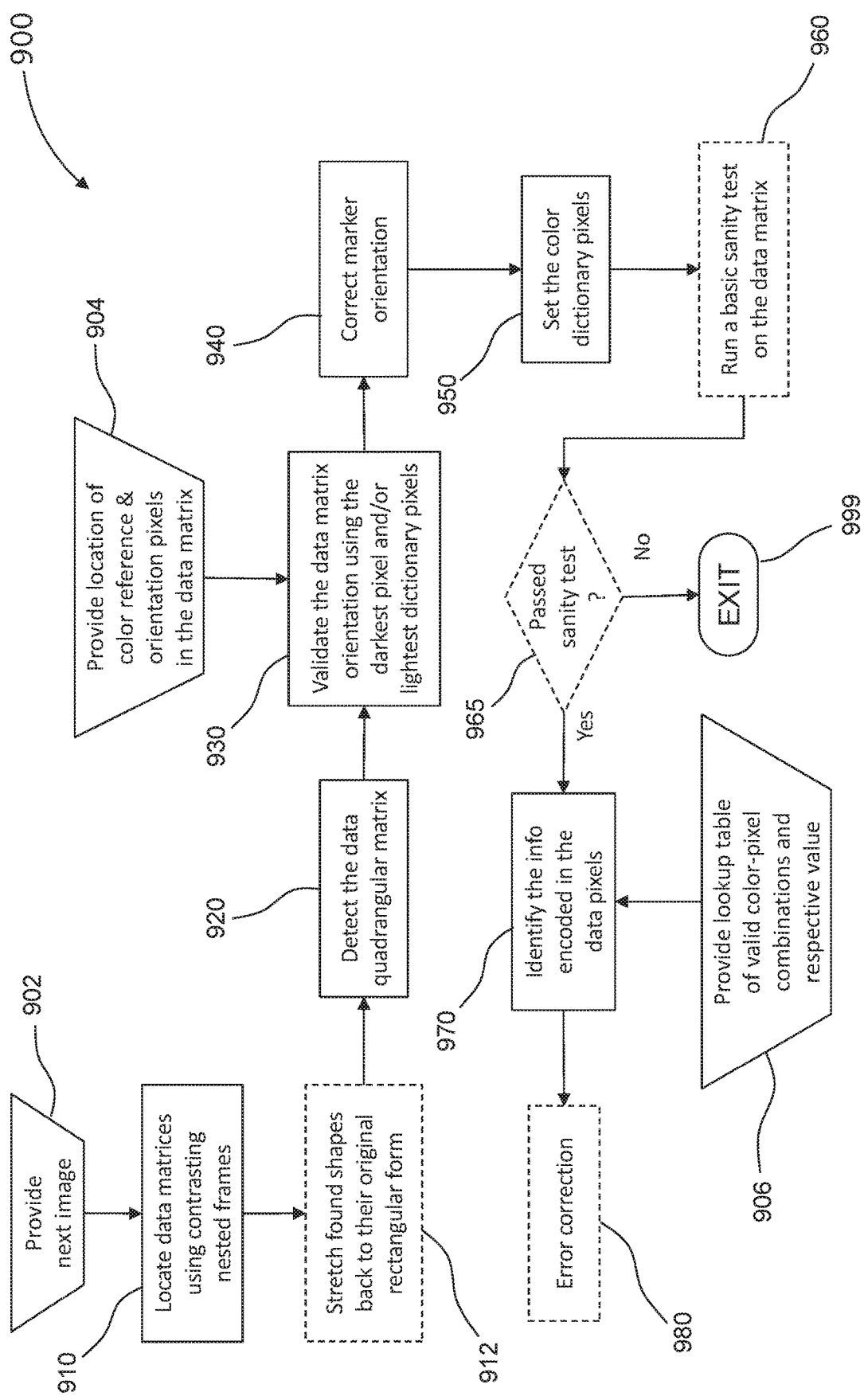
FIG. 14 shows in flow diagram of a participant-identification method, according to embodiments of the present invention.

With reference to FIG. 14, a more general participant-identification method 900 is shown in flow diagram 900, the participant-identification method 900 being a variation of the steps described above with reference to FIGS. 9 and 12, the method including the steps of:

In step 902, an image processor is provided with an image frame in which image frame at least one unique photo marker (430, 530, 630, 830) is captured as an imaged photo marker (430i, 530i, 630i, 830i), wherein the image processing unit is configured to identify the respective participant/object, wearing the respective EID numbers 40, by decoding the captured imaged photo marker (430i, 530i, 630i, 830i).

In step 910, the boundaries of the rectangular data matrices (450i, 550i, 650i, 850i), each encoded with respective combination of multi colored pixels, are detected using contrasting nested frames (460i, 462i, 560i, 562i, 660i, 662i, 860i, 862i).

When an image frame is acquired, the photo marker images (430i, 530i, 630i, 830i) are typically acquired by a camera situated such that the optical axis of the camera is not normal to the rectangular data matrices (450, 550, 650, 850) plane and distal therefrom. Therefore, the rectangular data matrix is typically distorted such that it is represented by a quadrangular in which at least one of the angles is not 90°. Hence, in optional step 912, the quadrangular representing the rectangular data matrix is stretched by the image processor to thereby reconstruct a rectangular image of the rectangular data matrix (450i, 550i, 650i, 850i).

In step 920, the boundaries of each rectangular data matrix (450i, 550i, 650i, 850i), including reference pixels (454i, 554i, 654i, 854i), is identified inside the matrix locator.

In step 930, the image processor validates the data matrix (450, 550, 650, 850) orientation using one or more of the index pixels (454, 554, 654, 854). In a non-limiting example (see FIGS. 11 and 12), the black index pixel (854B) is place at the bottom-right corner (as viewed by the camera) of rectangular data matrix (850) and the white index pixel (854W) is place at the top-left corner (as viewed by the camera) of rectangular data matrix (850). When analyzing the image frame of the respective rectangular data matrix (850), it is validated that the darkest imaged index pixel (854Bi) is located at the bottom-right corner (as viewed by the camera) of rectangular data matrix (850i) and/or that the lightest index pixel (854Wi) is located at the top-left corner (as viewed by the camera) of rectangular data matrix (850i). If not, the image is rotated, in step 940) by 90° until it is determined that the bottom-right index pixel is the darkest orientation pixel 856, and/or the top-left index pixel is the lightest orientation pixel 856. If this process fails, the imaged rectangular data matrix (850i) is discarded.

In step 950, the dictionary hue pixels (454i, 554i, 654i, 854i), each having a known reference pixel at a pre-set location, are detected. Each of the dictionary hue pixels (454i, 554i, 654i, 854i) is then used as an index for to identify a particular hue used in the pixel combination in that rectangular data matrix (450i, 550i, 650i, 850i).

Optionally, in step 960, a preconfigured sanity test is performed. For example, with no limitations, check if one or more of the index pixels are at their respective preconfigured location. For example, check if the lightest index pixel is at its preconfigured location.

If the sanity test fails (step 965), discard the photo image (step 999).

In step 970, the color of each data pixel of the data matrix (450i, 550i, 650i, 850i) is determined by comparing to the detected (in step 930) hue index pixels (454i, 554i, 654i, 854i). Then, using a preset lookup table (906), the info encoded by the combination of the data pixels (452, 552, 652, 852) is extracted.

Optionally, if the detected combination of the data pixels (452, 552, 652, 852) cannot be found in the lookup table (906), in step 980, correction of the combination of the data pixels (452, 552, 652, 852) is performed. For example, when the potential number of participants/objects that a matrix provides is much higher than required at a particular event/application, some of the pixels value may be adjusted, for example, by using Hamming codes or Reed-Solomon, to find the valid code that is the nearest to the erroneous code.

It should be noted that the reduction in the number of pixels of a matrix of a photo marker also enables to enlarge the pixel size of the outer and inner frames, to thereby enhance the detection quality of the pixels of the matrix of the photo marker.

It should be noted that the use of non-binary 2D photo markers is not limited to rectangular matrices and can be used also with square matrices.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A multicolor 2D-photo-marker comprising a rectangular matrix of data pixels, framed by a contrasting matrix locator comprising two substantially concentric frames having contrasting colors, wherein said rectangular matrix of data pixels further comprises at least one orientation data pixel having photo-marker orientation information and located at a pre-selected location, and wherein a unique color and location combination of said matrix of data pixels is configured to encode identification information of an object with which the multicolor 2D-photo-marker is coupled, said multicolor 2D-photo-marker preconfigured to be displayed on the object in a standing or a lying position; wherein said data pixels are stretched sideways to compensate for at least some of a narrowing down effect of said data pixels horizontal dimension, caused by a horizontal angle formed between an optical axis of a camera and a surface plane of the 2D-photo-marker.

2. The 2D-photo-marker as in claim 1, wherein said data pixels have at least one chosen from a list including: two colors, three colors, four colors, and black-and-white.

3. The 2D-photo-marker as in claim 2, wherein said data pixels have three colors and where said colors comprise a first color, a second color and a third color, the third color composed of dithering of said first color and said second color.

4. The 2D-photo-marker as in claim 1, wherein said pre-selected location of said at least one orientation data pixel is at a corner of said rectangular matrix of data pixels.

5. The 2D-photo-marker as in claim 1, wherein said rectangular matrix of data pixels comprises two orientation pixels having contrasting colors.

6. The 2D-photo-marker as in claim 1, wherein said rectangular matrix of data pixels includes color reference pixels, each color reference pixel located at a pre-selected location, designated to serve as dictionary hue pixels.

7. The 2D-photo-marker as in claim 6, wherein said pre-selected location of each of said color reference pixels is at a corner of said rectangular matrix of data pixels and wherein said orientation data pixel is a color reference pixel.

8. An identification system for identifying at least one person or object, the at least person or object having an identity uniquely encoded in a multicolor rectangular data matrix of pixels of a 2D-photo-marker as in claim 1, the system comprising:
   a. a camera, being a still camera or a video camera; and
   b. a processing unit,
   wherein said identification system is configured to analyze an image frame containing at least one 2D-photo-marker, said at least one 2D-photo-marker coupled with a participant of an event with mass participation;
   wherein said image frame is acquired such that the optical axis of said camera not normal to the plane of said 2D-photo-marker and distal therefrom;
   wherein said processing unit is configured to correct the orientation of said reflection of said at least one 2D-photo-marker;
   wherein said processing unit is configured to determine the colored data pixels of said rectangular data matrix of pixels and the respective pixels locations within said rectangular data matrix; and
   wherein said processing unit is configured to extract said identity information identifying the person/object.

9. A method for identification of an object or a person, whose identity is uniquely encoded in a multicolor rectangular data matrix of pixels of a 2D-photo-marker, as in claim 1, the method comprising the steps of:
   a. acquiring an image frame containing a reflection of at least one said 2D-photo-marker;
   b. locating said multicolor rectangular data matrix of pixels using said matrix locator;
   c. locating said at least one orientation data pixel;
   d. validating the orientation of said 2D-photo-marker and correcting as needed;
   e. locating the dictionary hue pixels;
   f. setting data pixels color and location, using said dictionary hue pixels;
   g. providing a list of valid color-pixel and location combinations; and
   h. decoding said data matrix to thereby extract said identity information identifying the person/object.

10. The object identification method as in claim 9, wherein said at least one orientation data pixel is a darkest corner pixel of said multicolor rectangular data matrix of pixels.

11. The object identification method as in claim 10, wherein said validating of the orientation of said 2D-photo-marker includes verifying that said darkest corner pixel is at an expected corner of said multicolor rectangular data matrix of pixels.

12. The object identification method as in claim 11, wherein upon determining that said darkest corner pixel is not at the expected corner of said multicolor rectangular data matrix of pixels, said correcting the orientation of said 2D-photo-marker includes rotating said 2D-photo-marker until said darkest corner pixel is located at the expected corner of said multicolor rectangular data matrix of pixels.

13. The object identification method as in claim 9 further including a step of sanity check, after said setting of said data pixels color and location.

14. The object identification method as in claim 13, wherein said sanity check comprises validating that a lightest corner pixel is located at the expected corner of said multicolor rectangular data matrix of pixels.

15. The object identification method as in claim 13, wherein said sanity check comprises validating that a shade difference between the lightest pixel and the darkest pixel is larger than a preconfigured threshold.

16. The object identification method as in claim 13, wherein said sanity check comprises validating that a brightness of a brightest pixel is higher than a preconfigured threshold.

17. The object identification method as in claim 13, wherein said sanity check comprises validating that a darkness of a darkest pixel is higher than a preconfigured threshold.

18. The object identification method as in claim 9, wherein said acquiring of said image frame is performed distally from said at least one said 2D-photo-marker.

19. The object identification method as in claim 9, wherein said image frame contains multiple said 2D-photo-markers.

20. The object identification method as in claim 9, wherein the image acquisition device is pointed towards multiple objects and wherein at least one object displays said 2D-photo-marker.

* * * * *